LATCHING MICROWAVE DIGITAL ATTENUATOR

Filed Aug. 24, 1965

WITNESSES

Theodore F. Wrobel

James F. Young

INVENTORS
Raymond R. Jones
& Joseph A. Kempic
BY
Ernest P. Klipfel
ATTORNEY 3,316,508

LATCHING MICROWAVE DIGITAL ATTENUATOR

Raymond R. Jones, Baltimore, and Joseph A. Kempic, Ellicott City, Md., assignors to Westinghouse Electric Corporation, Pittsburgh, Pa., a corporation of Pennsylvania Filed Aug. 24, 1965, Ser. No. 482,071
7 Claims. (Cl. 333—24.2)

The present invention relates generally to microwave amplitude modulators and more particularly relates to a fast switching digital amplitude modulator for a microwave signal.

Radar and electronic systems often have exacting requirements for a fast switching modulator with a low D.C. power consumption. For example, an electrically controlled variable attenuator may be used for automatically stabilizing the amplitude of frequency modulation oscillators and pulse shaping of microwave energy.

An object of the present invention is to provide a high speed digital amplitude modulator for a microwave signal.

Another object of the present invention is to provide a microwave amplitude modulator capable of extremely low power, sub-microsecond switching for digitally varying the amplitude of the microwave energy.

Briefly, the present invention accomplishes advantages and the above cited objects by providing a plurality of ferrite elements of varying lengths longitudinally disposed within the central portion of a waveguide. Resistive cards are disposed within said waveguide between each ferrite element and the H walls of the waveguide. Latching control wires extend through each ferrite for imposing a circular magnetic field to selected elements to cause the elements so energized to become permanently magnetized in one of two stable remanent magnetization states. Once latched, no holding power is required. In one remanent state the ferrite element will concentrate the electric field distribution of the microwave energy within the ferrite. However, in the other remanent state the regions of intense radio frequency electric field will be displaced and positioned at the location of the resistive cards where at least some of the microwave energy will be absorbed. Hence, the power absorption of the microwave energy will be dependent upon the length of the ferrite element displacing the electric field and the absorptive characteristics of the resistive cards. The amplitude of the microwave energy through the wave guide can be varied in digital steps by selectively latching at least one ferrite element or any combination of ferrite elements to displace the electric field, directing the field to particular resistive cards.

Further objects and advantages of the present invention will be readily apparent from the following detailed description taken in conjunction with the drawing in which.

Figure 1:
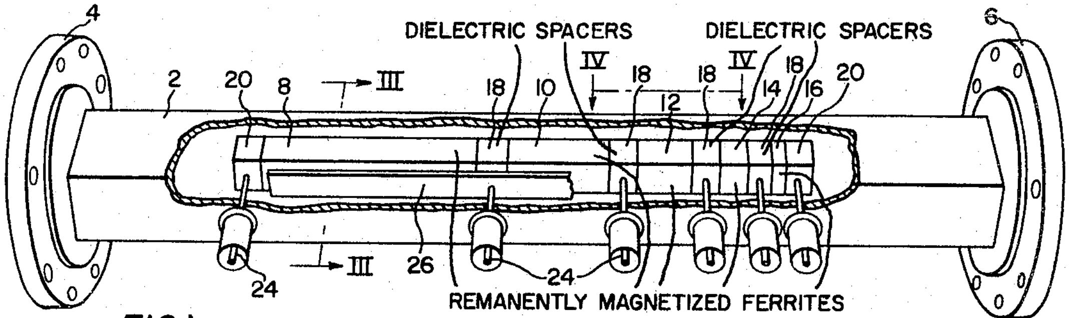
FIGURE 1 is a perspective view, partly in section, of an illustrative embodiment of the present invention.
Figure 4:
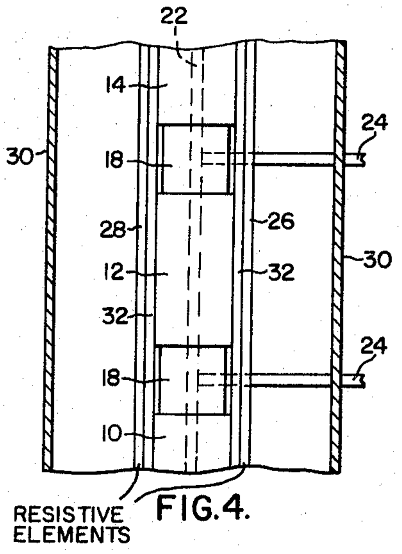
FIGURE 4 is a sectional top view taken along the line indicated by the arrows IV—IV of the illustrative embodiment of FIG. 1.

Referring to FIG. 1, a waveguide 2 having an input port 4 and an output port 6 for microwave energy has disposed therein a plurality of varying length ferrite elements 8, 10, 12, 14 and 16 aligned end to end and extending along the longitudinal axis of the waveguide 2. Dielectric spacers 18 separate adjacent ferrite elements so that switching of one ferrite element does not partially demagnetize the adjacent ferrite elements. Impedance matching elements 20 shown at the input and output ends of the array of ferrite elements, are short quarter wavelength sections of dielectric material to match the impedance of the air filled waveguide to the ferrite loaded waveguide since ferrite has a dielectric constant greater than air. A latching conductor 22 (FIGS. 3 and 4) extends through the center of the ferrite elements 8 through 16. Latching control wires 24 are connected to the latching conductor 22 to pass a current pulse down the center of selected ferrite elements. Where desired, an individual latching conductor for each ferrite element may be used.

Figure 2:
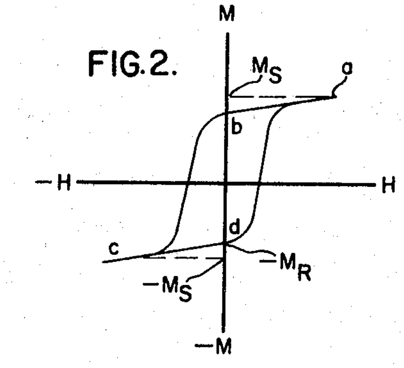
FIGURE 2 is a hysteresis curve useful in understanding the operation of the present invention.

The switching operation of each ferrite element may be understood by reference to FIG. 2. Each ferrite element is chosen to have a square loop magnetization curve in which the remanent magnetization $M_R$ is almost equal to the saturation magnetization $M_S$. The selected ferrite element is magnetized in a circumferential direction by passing a current therethrough by means of the latching conductor 22. A positive current pulse will magnetize the material to saturation in the plus direction (point *a*). Since the ferrite element is in the form of a closed magnetic circuit within the waveguide, it will retain the larger part of its magnetization (point *b*) when the current pulse is removed. The ferrite element is then said to be "latched" at its positive remanent magnetization point. However, if a negative current pulse of sufficient magnitude is applied, the magnetization will be reversed and the material will remain set at point *d* when the current pulse is removed. Points *b* and *d* represent the two states of permeability of the ferrite.

Figure 3:
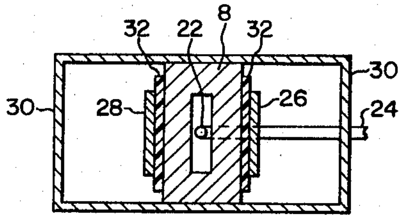
FIGURE 3 is a cross sectional view as taken looking down the waveguide along the arrows indicated III—III.

In accordance with the present invention, resistive cards 26 and 28 are disposed within the waveguide 2 between the ferrite elements and the H walls 30 of the waveguide 2. FIG. 3 illustrates the disposition of the resistive cards 26 and 28 about the ferrite element 8. Separators 32 of any suitable material such as polyfoam position the resistive cards from the ferrite element 8. When desired, individual resistance cards for each ferrite element may be utilized rather than one long card on each side as illustrated.

Figure 5:
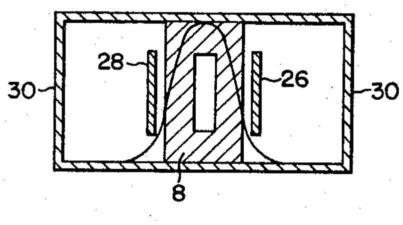
FIGURE 5 is a graphical representation of the electric field distribution within a waveguide when the present invention is in one of its operating state.

In operation, and assuming a current pulse of predetermined direction and magnitude sufficient to latch the ferrite element 8, for example, in a negative remanent state of permeability, $\mu-$, the microwave energy signal within the waveguide when in the $TE_{10}$ mode will have an electric field distribution with its region of maximum or intense radio frequency electric field centrally positioned within the waveguide and hence directed to the alignment of ferrite elements. Should all of the ferrite elements be in their negative remanent states of permeability the amplitude of the microwave signal through the waveguide will be at a maximum. In this state of permeability, $\mu-$, it can be seen from FIG. 5 that the RF energy does not see the resistive cards 26 and 28.

Figure 6:
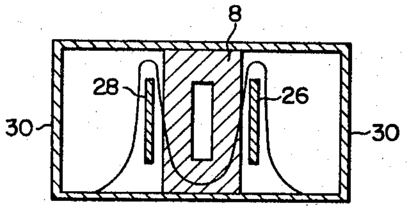
FIGURE 6 is a characteristic curve of the electric field distribution within a waveguide when the present invention is in its other operating state.

However, when a current of proper magnitude is sent through the latching conductor 22 in the opposite direction, the ferrite elements so energized will be latched into their other remanent state; a positive permeability $\mu+$ is achieved. The electric field of the microwave energy in the $TE_{10}$ mode through the waveguide is accordingly displaced from those ferrite elements latched in their other remanent state and the distribution of electric field intensity is as illustrated in FIG. 6. The microwave energy is displaced in such a manner that the region of intense radio frequency electric field is directed to the resistive cards 26 and 28 where the microwave energy is absorbed in accordance with the absorbing characteristics and size of the resistive cards.

Hence, it is readily apparent that rapid amplitude modulation of the microwave energy through the waveguide can be achieved by selectively latching one or more of the ferrite elements into either positive state or negative state or remanent permeability. Due to the digital latching technique the ferrite elements can be readily switched very quickly with small power consumptions.

Representative values of an amplitude modulator in accordance with the present invention at C— band frequencies, with losses in the unmodulated state not exceeding 0.5 db and isolation of better than 30 db in fully modulated condition, are 1½ in. by ¾ in. outside dimensions of the waveguide 2 with the ferrite elements mounted therein having a height of .622 in. and a width of .3 in. The width of the separators 32 is in the order of .1 to .2 in. while the width of the resistive cards 26 and 28 is .005 in. The resistivity of the cards 26 and 28 may be chosen to be on the order of 100 ohms per square centimeter. The apparatus operated successfully over a range of 5.4 to 5.9 gigacycles with a bandwidth of at least 10%.

While the present invention has been described with a degree of particularity for the purpose of illustration, it is to be understood that all modifications, alterations and substitutions within the spirit and scope of the present invention are herein meant to be included. The material for separating the resistive cards 26 and 28 from the ferrite elements may be of any suitable material such as polyfoam which does not attenuate, or is invisible to, microwave energy. The resistive cards 26 and 28 may be of micasheet upon which a very thin film of pure metal is deposited. Of course, any suitable resistive means to microwave energy for dissipation thereof may be utilized.

Even though the term ferrite material has been referred to throughout, any suitable ferri-magnetic or gyromagnetic material, such as, for example, spinel-type materials and garnet-type ferrites which contain rare earths may be utilized and such term is herein meant to include any such material.

We claim as our invention:

1. A microwave amplitude modulator comprising in combination; a waveguide; at least one ferrite element disposed within said waveguide; said ferrite element having a first remanent state and a second remanent state; means for selectively latching said ferrite element in said first and said second state; resistive means disposed on opposite sides of said ferrite element; said ferrite element in one of its remanent states concentrating the electric field of the microwave power in the region of the ferrite element and in the other remanent state displacing said electric field to the position of said resistive means.

2. A microwave amplitude modulator comprising, in combination; a waveguide; at least one element of gyromagnetic material longitudinally disposed with the length of and within said waveguide; means for selectively latching said element in a first remanent state and a second remanent state; at least one resistive card disposed within said waveguide between said element and the waveguide for absorbing microwave power impinging thereon; said element in one of its remanent states concentrating the region of intense RF electric field within said element and in the other remanent state directing said region to the position of said resistive cards.

3. An attenuator for a microwave signal comprising, in combination; a waveguide including E walls and H walls; and input port and an output port connected to said waveguide for said microwave signal; ferrite means centrally disposed within and extending lengthwise through said waveguide; radio frequency absorbent material disposed between said ferrite means and said H walls for absorbing microwave power when the region of intense RF electric field is displaced from said ferrite means to said resistance means; and means for selectively latching said ferrite means in a first remanent state and a second remanent state; said ferrite means in one of its remanent states concentrating the region of intense radio frequency electric field within said ferrite means and in the other remanent state splitting and displacing said region to said resistance means.

4. A microwave amplitude modulator comprising, in combination; a waveguide including E walls and H walls; a plurality of ferrite means centrally disposed within said waveguide and aligned to extend lengthwise through said waveguide; a plurality of resistance means each disposed between a respective one of said ferrite means and said H walls for absorbing microwave power when the region of intense radio frequency electric field is directed thereto; means for selectively latching each said ferrite means to a first remanent state and a second remanent state; said ferrite means in one of its remanent states concentrating the region of intense radio frequency electric field within said ferrite means and in the other remanent state directing said region to its associated resistance means.

5. An amplitude modulator for a microwave signal in the $TE_{10}$ mode within a waveguide comprising, in combination a waveguide including an input port and an output port for said microwave signal; a plurality of ferrite elements aligned end to end and spaced apart along the longitudinal axis of said waveguide; respective resistance means disposed between each said ferrite element and the H walls of said waveguide for absorbing the region of intense radio frequency electric wave directed thereto; and means for selectively latching each said ferrite element in a first remanent state and a second remanent state; each ferrite element in one of its remanent states concentrating the region of intense radio frequency electric field within itself and in the other remanent state splitting and displacing said region to the position of its respective resistance means.

6. An attenuator for varying the amplitude of microwave energy comprising, in combination; a waveguide; a plurality of ferrite elements of different lengths longitudinally disposed end to end and extending through the center of said waveguide; at least one resistive card for each said ferrite element disposed between each ferrite element and the H wall of said waveguide for absorbing microwave power when the region of intense radio frequency electric field is directed by its respective ferrite element to pass over it; means for individually latching each said ferrite element selectively to a negative remanent state and a positive remanent state; each said ferrite element in response to said means for selectively latching displacing the region of intense radio frequency of electric field to the position of its respective resistive cards when in said positive remanent state and concentrating said region within said ferrite element when in said negative remanent state; the microwave energy exiting said output port having an amplitude variation functionally related to the length of the ferrite elements which are latched in said positive state of remanent permeability.

7. The apparatus of claim 6 wherein the microwave energy within said waveguide is in the $TE_{10}$ mode.

References Cited by the Examiner

UNITED STATES PATENTS

| | | | |
|---|---|---|---|
| 2,946,025 | 7/1960 | Miller | 333—24.2 |
| 3,188,582 | 6/1965 | Bowness | 333—24.2 |

OTHER REFERENCES

F. Reggia, "A New Broadband Absorption Modulator For Rapid Switching of Microwave Power," IRE Trans. on Microwave Tech., vol. 9, page 343, 1961.

HERMAN KARL SAALBACH, *Primary Examiner.*

P. GENSLER, *Assistant Examiner.*